US006711987B2

United States Patent
Yoakim et al.

(10) Patent No.: US 6,711,987 B2
(45) Date of Patent: Mar. 30, 2004

(54) COFFEE MACHINE WITH INTEGRATED STEAM DELIVERY DEVICE

(75) Inventors: Alfred Yoakim, St-Légier (CH); Mischa Stieger, St-Gallen (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/114,582

(22) Filed: Apr. 1, 2002

(65) Prior Publication Data

US 2003/0051603 A1 Mar. 20, 2003

Related U.S. Application Data

(63) Continuation of application No. PCT/EP00/09511, filed on Sep. 28, 2000.

(30) Foreign Application Priority Data

Oct. 14, 1999 (EP) .............................................. 99120443

(51) Int. Cl.[7] .............................................. A47J 31/44
(52) U.S. Cl. ........................ 99/293; 99/323.1; 99/323.3
(58) Field of Search ............................... 99/293, 323.1, 99/294, 323.3, 279, 275; 261/DIG. 10, DIG. 16, DIG. 76

(56) References Cited

U.S. PATENT DOCUMENTS

| 2,088,966 | A | * | 8/1937 | Lyons | 99/293 |
| 4,557,187 | A | * | 12/1985 | DePonti | 99/279 |
| 6,360,651 | B1 | * | 3/2002 | Kim et al. | 99/293 |
| 6,374,725 | B1 | * | 4/2002 | Leung | 99/293 |

* cited by examiner

Primary Examiner—Reginald L. Alexander
(74) Attorney, Agent, or Firm—Winston & Strawn LLP

(57) ABSTRACT

A coffee machine of the "espresso" type that includes a water tank, a pump, a heater unit and passages for feeding hot water and steam to a percolation nozzle. The machine includes an integrated steam delivery device having a steam inlet connected to a steam feed passage and a steam outlet. The steam delivery passages include a cylindrical body equipped with an aperture connected to the steam inlet and a cylindrical piece which can move within the body to open or close the steam circuit depending on its position in the body. A control member actuated by a control or trigger finger enables the steam outlet to be brought into contact with the aperture in the closure of a receptacle.

21 Claims, 5 Drawing Sheets

COFFEE MACHINE WITH INTEGRATED STEAM DELIVERY DEVICE

CROSS-REFERENCE TO RELATED APPLICATION

This application is a continuation of the U.S. national stage designation of International application PCT/EP00/09511 filed Sep. 28, 2000, the content of which is expressly incorporated herein by reference thereto.

BACKGROUND

The present invention relates to a coffee machine and more particularly to a coffee machine comprising an integrated device enabling steam to be delivered in order to heat and emulsify a liquid. The coffee machine forming the subject of the invention is thus particularly well suited for the making of cappuccino, which is obtained by adding hot, foaming milk to the coffee.

Some coffee machines of the traditional "espresso" type possess, in addition to the components necessary for the preparation of coffee, a steam jet emerging from the housing of the machine. A switch generally enables the operating mode of the machine to be selected. In a first operating mode, the water contained in the tank is aspirated by a pump which directs it to a heater unit enabling it to be heated. The hot water is then delivered to a percolation nozzle on which is fitted a filter-holding or cartridge-holding device containing the ground coffee. In a second mode of operation, the hot water is passed to the steam jet in order to produce either hot water or steam.

In order to heat and emulsify a liquid such as milk, it is necessary to plunge the steam jet into a receptacle containing the liquid to be heated.

These machines have disadvantages regarding maintenance and ease of use. In order to heat or emulsify a liquid, it is necessary to bring the receptacle containing the liquid below the jet and to hold it in a position such that the distal end of the jet is immersed in the liquid. The steam gushing from the jet causes splashing if it is not completely immersed in the receptacle or if the latter does not contain sufficient liquid.

Another disadvantage arises from the fact that the steam jet is solidly fixed to the frame of the coffee machine. It cannot therefore be dismantled for cleaning purposes, which may incidentally result in hygiene problems. Accordingly, there is a need for improvements in these type machines.

SUMMARY OF THE INVENTION

The present invention remedies the abovementioned disadvantages by providing a coffee machine of the "espresso" type possessing an integrated device making it possible to emulsify a liquid, such as milk for example. This device is extremely simple to use and easy to maintain, and makes it possible to prevent any undesirable splashing of liquid.

The invention specifically relates to a coffee machine comprising a water tank, a pump, a heater unit, passages for feeding hot water and steam to a percolation nozzle, a receptacle containing a liquid to be heated or emulsified, a closure covering the receptacle and including an aperture, and an integrated steam delivery device. The steam device comprises a steam inlet connected to a steam feeding passage, a steam outlet, and means for moving the steam outlet into contact with the closure aperture.

The enabling means preferably comprises a hollow body having a radial aperture, a movable piece, a resilient member for moving the movable piece within the body, and a control member operatively associated with the resilient member for moving the steam outlet when desired. The control member preferably includes a control finger emerging from the frame of the machine and pivotable about a pivot, one end of which is solidly fixed to the body and the other end of which is shaped like a sprout. If desired, guide means for the receptacle may be included. Thus, the control finger can act on a microswitch for controlling the production of steam, and be displaced by a lateral wall of the receptacle when the latter is in the operating position defined by the guide means.

The closure of the receptacle can include a steam tube connected to the aperture in the closure and directed towards the receptacle interior. If desired, the closure of the receptacle can include aspiration means for allowing the liquid to be aspirated by the tube and directed towards an outlet jet by a venturi effect. In this embodiment, the aspiration means are formed by an intake chamber communicating in its upper part with a pipe connected to the steam tube and in its lower part with a pipe ending in an aperture of the outlet jet. Also, the outlet jet may be pivotably mounted in the closure and, depending on its relative position with relation to the closure, it allows liquid to pass towards the outlet or steam to enter directly into the receptacle.

In a preferred embodiment, the closure of the receptacle comprises a steam tube, an outlet jet and an internal jet, with the outlet tube being pivotable to different positions to enable the liquid to emerge either to the outlet jet or to the internal jet. Also, a base can be included, preferably one that is provided with guide means and stop means that define a seating intended to accommodate and maintain the receptacle in an operating position.

Another embodiment of the invention relates to a receptacle for emulsifying a liquid, comprising a leaktight closure having an aperture connected to a steam tube that extends into the receptacle, the aperture of the receptacle being intended to be connected to the steam outlet of a coffee machine, such as one of those described herein. As above, the aperture can be connected to an intake chamber which is itself connected on one side to an outlet jet and on the other side by a venturi tube to the steam tube. Also, the outlet jet is preferably pivotable in the closure of the receptacle and, depending on its relative position in relation to the closure, a connection to the intake chamber is sealed or opened. Advantageously, the aperture is shaped so as to be automatically connected to the steam outlet of a coffee machine when the receptacle is positioned on that machine, and can be connected to an intake chamber, which is itself connected to an outlet jet, by a venturi tube to a steam tube and to an internal jet.

BRIEF DESCRIPTION OF THE DRAWINGS

Other advantages are apparent from the features stated in the dependent claims and the description below which sets out the invention in greater detail with the aid of drawings representing, diagrammatically and by way of example, an embodiment of a coffee machine according to the invention.

DETAILED DESCRIPTION OF THE PREFERRED EMBODIMENTS

Figure 1:
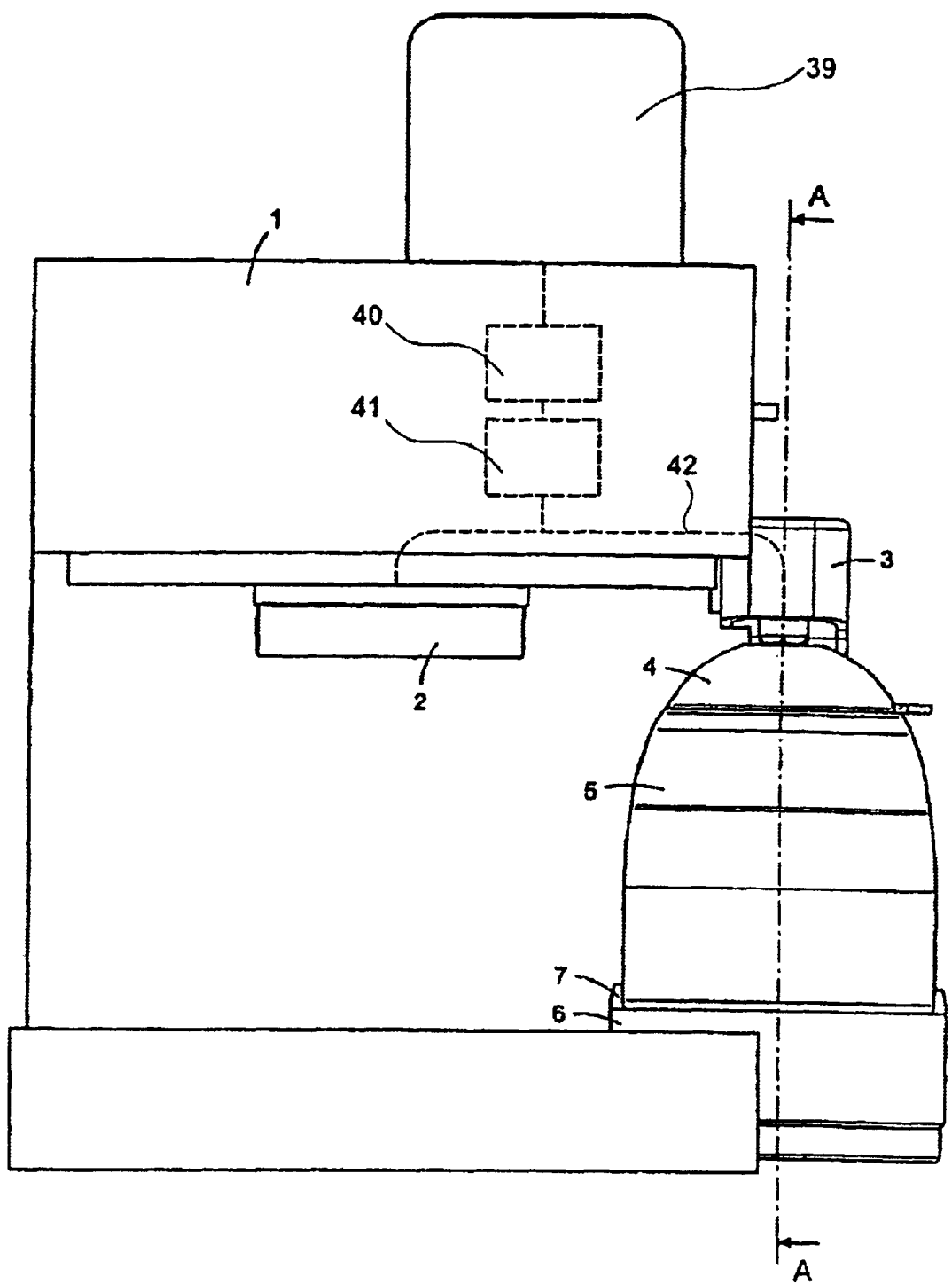
FIG. 1 is a frontal view of a coffee machine according to the invention, the receptacle containing the liquid to be emulsified being in the operating position.
Figure 2:
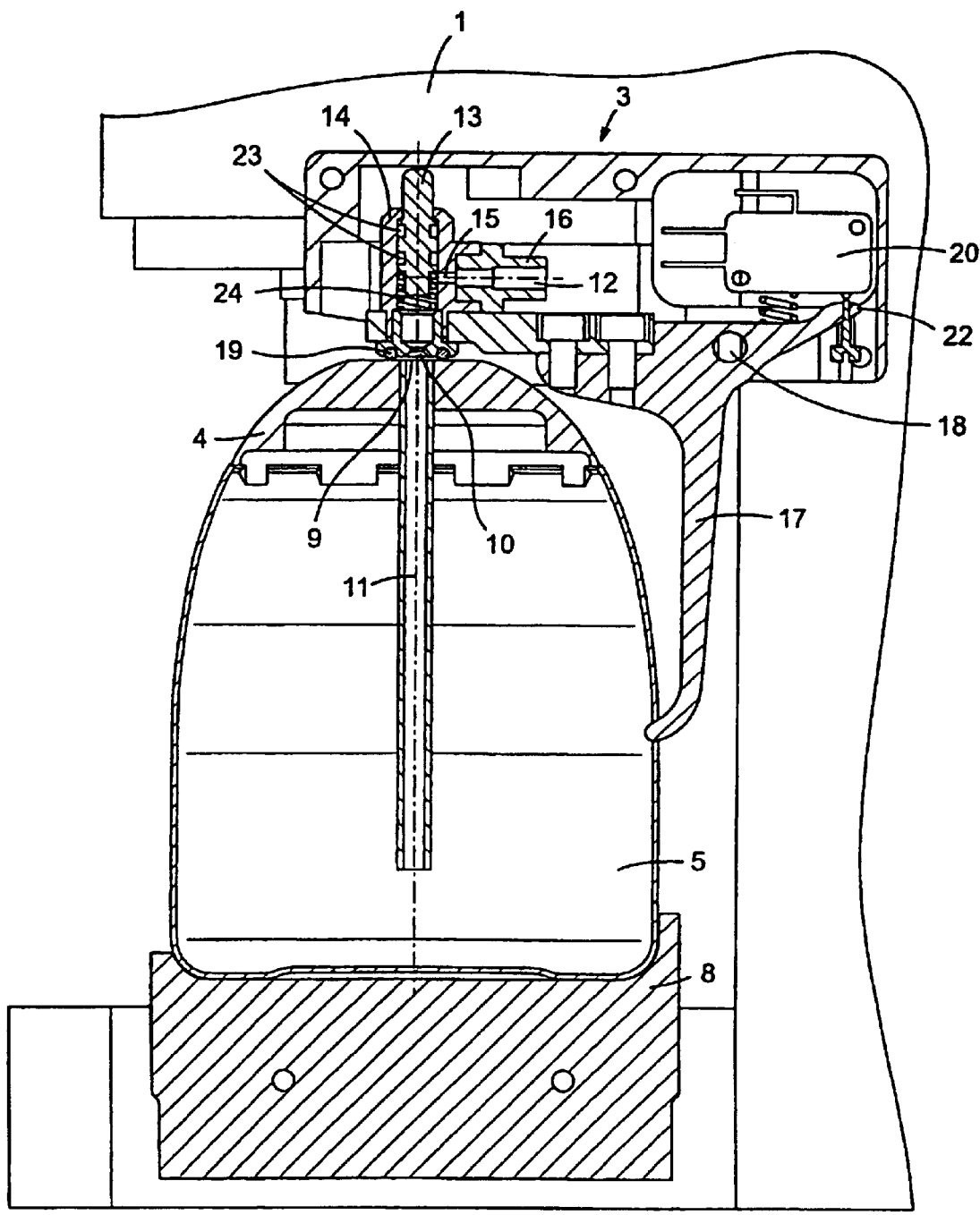
FIG. 2 is a sectional view along the line A—A in FIG. 1.

With reference to FIGS. 1 and 2, the coffee machine comprises a frame 1 incorporating the traditional components of a coffee machine of the "espresso" type, such as a water tank 39, a pump 40, a heater unit 41, water and steam feed circuits or passages 42, and the control members or buttons making it possible to select and activate the various functions provided. The mode of operation of machines of this type having been extensively described in the prior art, it will not be repeated herein.

The coffee machine includes a percolation nozzle 2 intended to receive a filter carrier or cartridge carrier containing the ground coffee. It also has a steam delivery device 3 which interacts with the closure 4 of a receptacle 5. The receptacle 5, in the operating position, rests on a base 6 that is solidly fixed to the lower part of the frame 1. The base 6 has lateral edges 7 raised so as to assist the guiding of the receptacle 5 when it is placed in the operating position. The rear part 8 of the base 6 likewise has an over-thickness acting as a detent or end-of-travel stop member. By virtue of its particular shape, the base enables the receptacle 5 to be positioned easily and precisely in the seating defined by the lateral edges 7 and the back 8 of the base so that the aperture 9 in the closure 4 faces the steam outlet 10 of the steam delivery device 3.

The closure 4 of the receptacle 5 is equipped with a steam tube 11 which allows steam to be passed to the interior of the receptacle 5. The steam tube 11 has a length of between 50 and 90% of the depth of the receptacle 5. Preferably, the tube 11 has a length which corresponds approximately to 80% of the depth of the receptacle 5, so as to be capable of being used when the receptacle 5 is only partially filled.

The steam delivery device 3 possesses a vapor or steam inlet 12 connected to the steam delivery passages (not shown in FIG. 2). The steam inlet 12 communicates via a steam intake connector 16 with a valve formed by the cylindrical piece 13 which can slide freely in the cylindrical body 14. The cylindrical body 14 has a radial aperture 15 which opens into the steam intake connector 16. The cylindrical body 14 has an aperture on its upper part which enables the upper part of the cylindrical piece 13 to emerge from the body 14. The unit formed by the cylindrical body 14 which receives the connector 16 can move under the action of a control member equipped with a control finger 17 pivoted about a pivot 18. The cylindrical piece 13 has, in its central part, a diameter substantially equal to the internal diameter of the body 14. Two annular grooves 23 are machined in the central part of the piece 13 and are intended to accept gaskets of the O-ring type. The lower and upper parts of the piece 13 have a diameter smaller than the internal diameter of the body 14. This reduced diameter substantially corresponds to that of the aperture situated on the upper part of the cylindrical body 14, so that the piece 13 can emerge from the body 14 depending on the position of the unit (see FIG. 2). A resilient member, such as a spring 24, is disposed in the lower part of the body 14 and exerts its action so as to force the position of the cylindrical piece 13 upwards into the body 14. In the operating position shown in FIG. 2, the upper part of the piece 13, subject to the action of the spring 24, emerges from the body 14. In this position, the radial aperture 15 of the body 14 faces the lower part of the piece 13, below the gaskets accommodated in the grooves 23, and hence enables steam to pass from the intake connector 16 connected to the steam inlet 12 towards the steam outlet 10.

The lower part of the body 14, forming the steam outlet 10, comes into contact with the aperture 9 of the closure 4 in the operating position. An annular seating in which a gasket of the O-ring type 19 is provided ensures leaktightness between the steam outlet 10 and the aperture 9 of the closure 4.

The other end of the control member, relative to the pivot point, includes a sprout 22 which actuates a microswitch 20 for controlling steam production.

Figure 3:
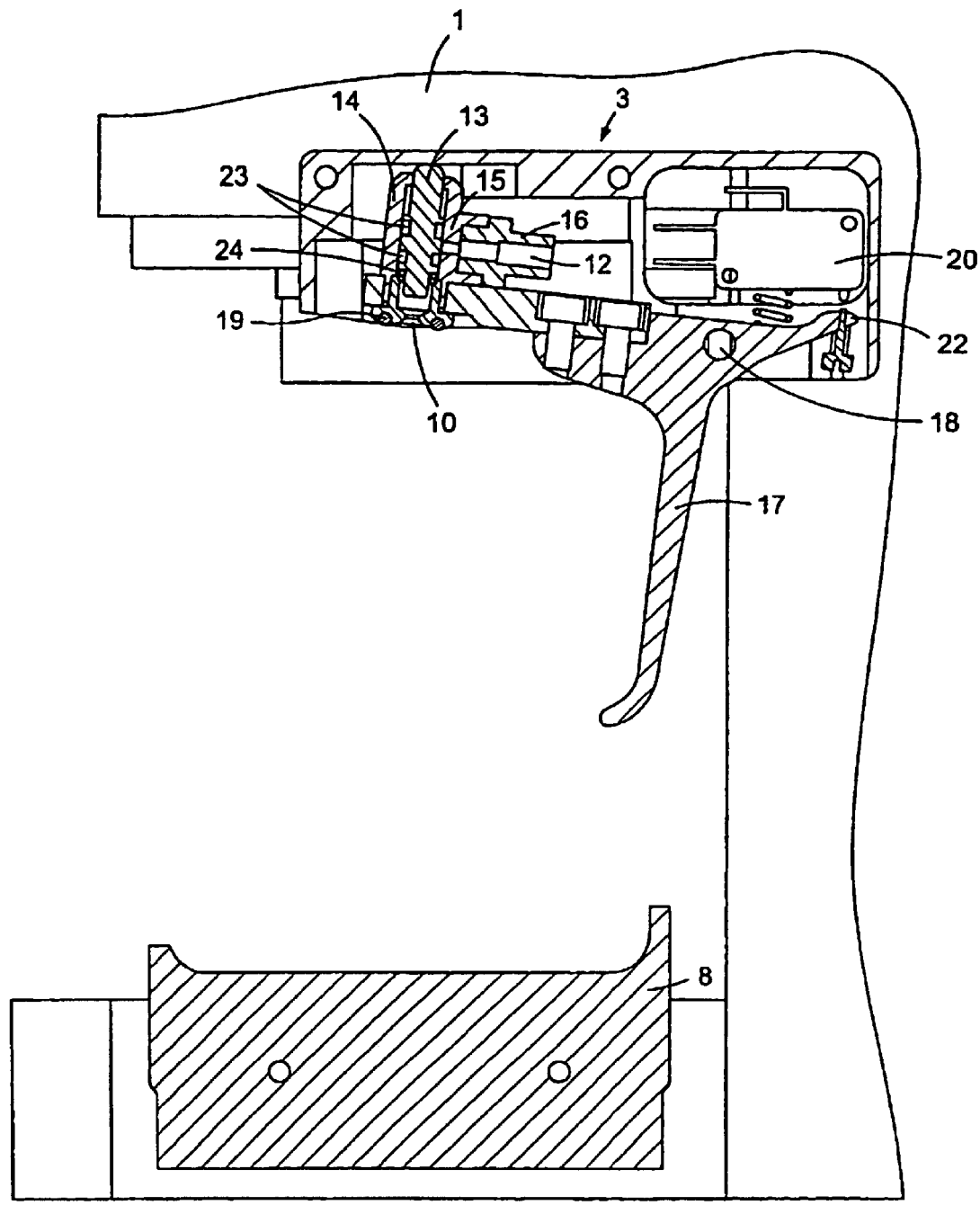
FIG. 3 is a sectional view of the steam delivery device in the position of rest.

When the receptacle 5 is withdrawn from its seating 6, 7, 8, the control finger 17 returns to the position of rest under the action of a resilient member, pivoting about the pivot 18. In doing so, it displaces all the pieces 13, 14, 16 upwards, and these then occupy the position shown in FIG. 3. In this position, the piece 13, in abutment against the frame of the device, is forced against the action of the spring 24 into the interior of the body 14. The aperture 15 is then opposite the central part of the cylindrical piece 13, the gaskets situated in the grooves 23 being located on either side of the aperture 15, thus guaranteeing the leaktight closure of the steam circuit.

On the other hand, the sprout 22 of the control member is no longer in contact with the microswitch 20 and thus triggers the production of steam.

The closure 4 of the receptacle 5 will preferably be equipped with holding means which enable it to be fixed in a leaktight manner on the receptacle 5. Any known means such as a screw thread or clip-type closure systems may be envisaged.

Use is thus very simple, since it is sufficient to fill the receptacle 5 with liquid, close it with the closure 4, then position it in the seating provided on the support. When the receptacle 5 reaches the back of the seating, it acts on the control finger 17 which progressively lowers the body 14 until the steam outlet 10 is positioned opposite the aperture 9 situated in the top of the closure 4. In this position, the steam circuit is open and the steam, passing through the tube 11, can emulsify the liquid contained in the receptacle.

Figure 4:
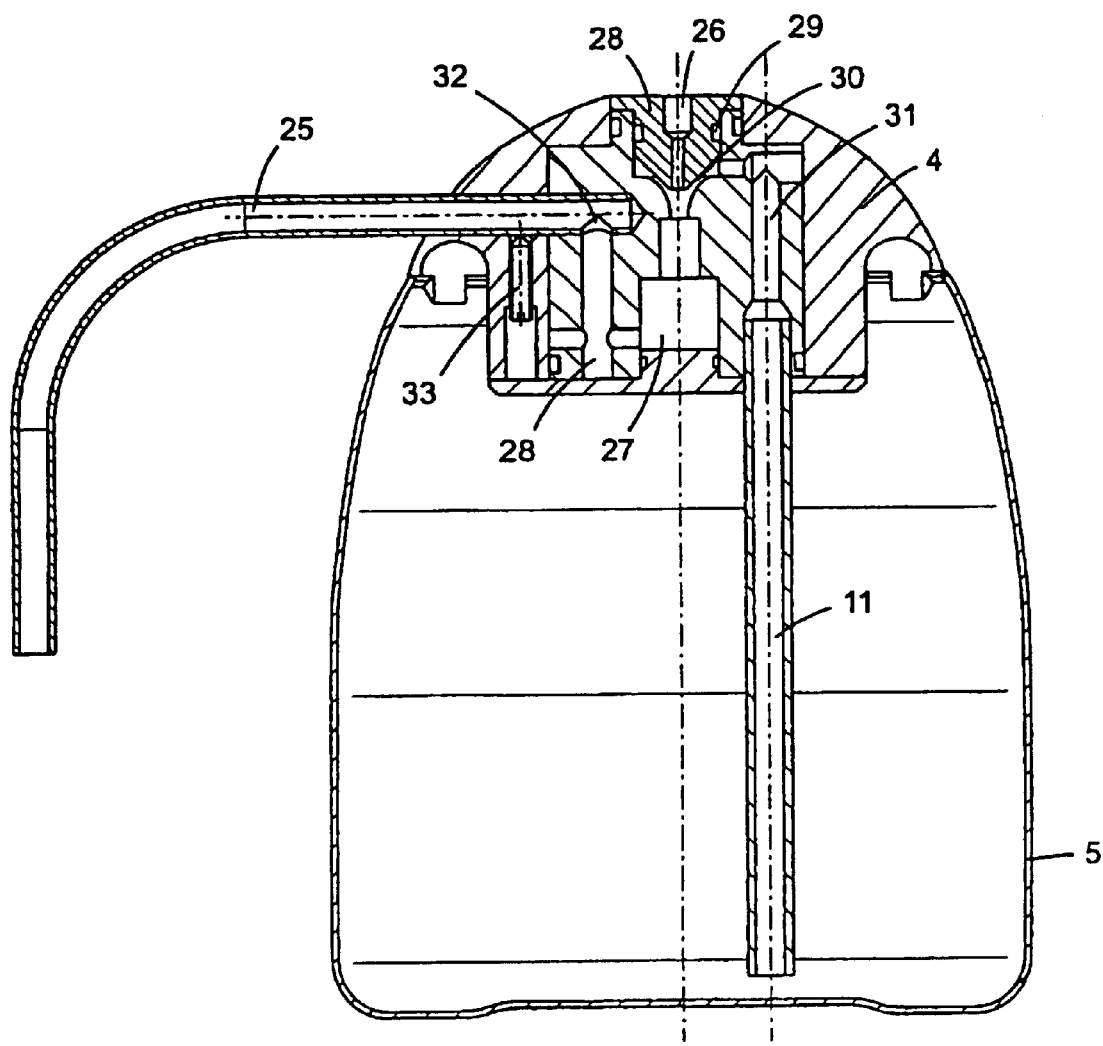
FIG. 4 is a sectional view of an alternative embodiment of the receptacle interacting with the steam delivery device of the coffee machine shown in FIG. 1.

FIG. 4 shows an alternative embodiment of the receptacle 5, which has in its closure 4 a device for delivering the emulsified liquid directly into a cup via an outlet jet 25. In this alternative embodiment, the intake of steam takes place via an intake pipe 26 into an intake chamber 27 which has, in its lower part, an aperture opening into a pipe 28, itself connected to the outlet jet 25. The piece 28 comprises the intake 26 and includes an annular groove 29 intended to receive a gasket. Below this gasket, the piece 28 includes, in its lower part, a frustoconical section which provides a small passage 30 within the pipe 31 to connect the steam tube 11 to the intake chamber 27. When the steam is injected via the intake pipe 26 into the chamber 27, the liquid contained in the receptacle is aspirated by a venturi effect, through the steam tube 11, the pipe 31 and the passage 30 to the chamber 27. In the chamber 27, the liquid emulsifies under the action of pressure, then the steam/liquid mixture escapes via the pipe 28 to the outlet jet 25. The outlet jet 25 can pivot about a horizontal axis. The part of the jet 25 located within the closure possesses an aperture 32 over part of its circumference which opens, in the position shown in the drawing, into the pipe 28. When the jet 25 is pivoted through at least one quarter of a turn, the aperture 32 is no longer opposite the pipe 28 and the steam circuit is thus closed. In this position, the steam will be directed to the interior of the receptacle via the passage 30, the pipe 31 and the steam tube 11 and will cause the emulsification of the liquid in the receptacle, as described above. An adjusting screw 33 acts by friction on the outlet jet 25 to enable it to be held in the pivoted position and thus avoid any premature change of position. There also exists, in this version, the possibility of directly emulsifying the liquid, for example milk, in the receptacle by the pipe 11.

Figure 5:
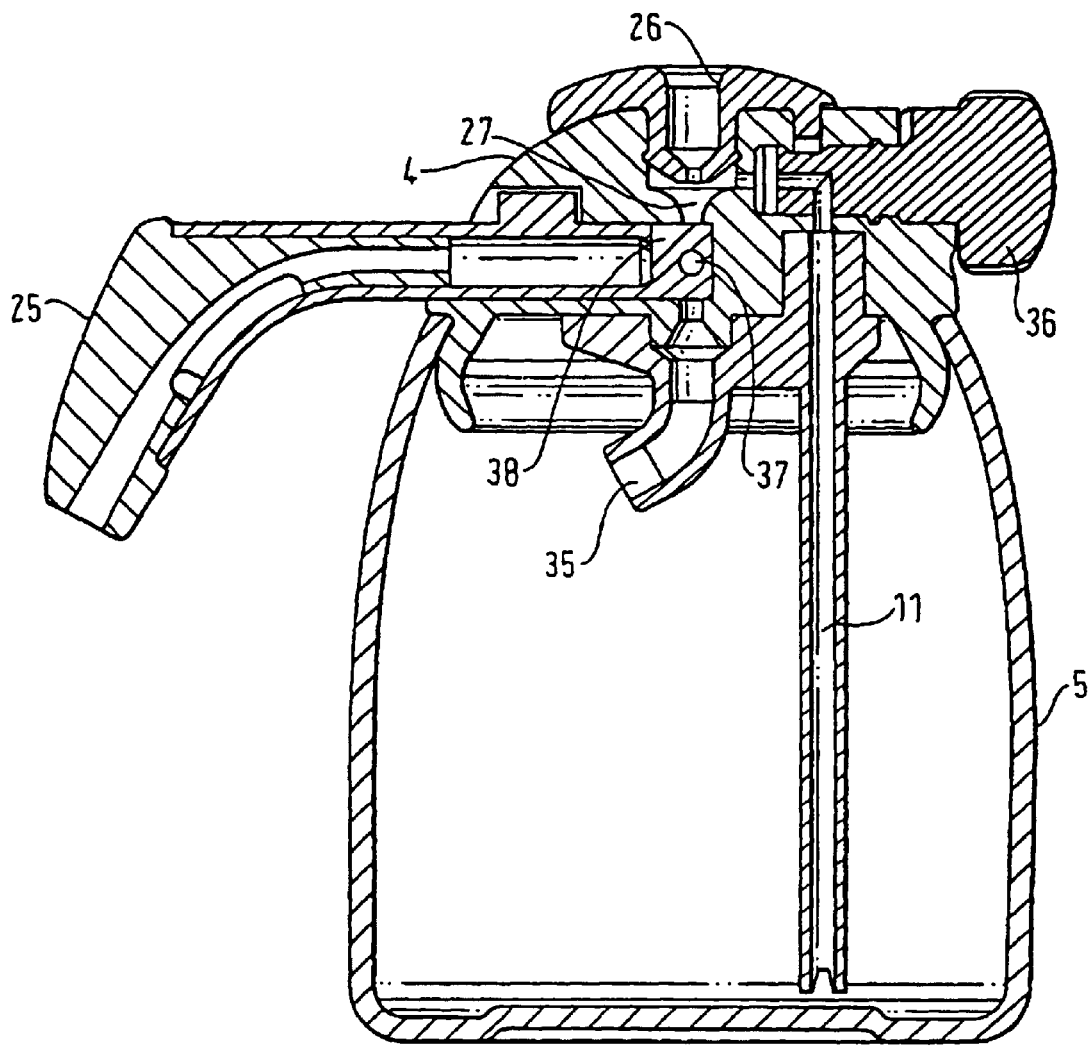
FIG. 5 is a sectional view of another alternative embodiment of the receptacle interacting with the steam device shown in FIG. 3.

FIG. 5 illustrates another embodiment, specifically that of emulsifying the liquid with an internal jet 35. The steam intake still takes place via the intake pipe 26 into an intake chamber 27. The difference from this device to the one shown in FIG. 4 is the presence of the internal jet 35. In the position shown in FIG. 5, the liquid is aspirated by the tube 11 and the steam arriving at 26 emulsifies the liquid in the chamber 27, which liquid emerges at 38 via the outlet jet 25.

If the jet 25 is turned through one quarter of a turn, the bore 37 faces the intake chamber 27 and the emulsified liquid returns into the receptacle 5 via the internal jet 35. When all the liquid is emulsified, the closure of the receptacle 5 is released and a quantity of foamed milk can be manually added to each cup of coffee.

Finally, the knurled wheel 36 allows the intake of air into the system to be adjusted.

With one or other of the receptacles described, the coffee machine according to the invention makes it easily possible to emulsify a liquid with no risk of splashing of liquid during use thereof.

What is claimed is:

1. A coffee machine comprising a water tank, a pump, a heater unit, passages for feeding hot water and steam to a percolation nozzle, a receptacle containing a liquid to be heated or emulsified, a closure covering the receptacle and including an aperture, and an integrated steam delivery device comprising a steam inlet connected to a steam feeding passage, a steam outlet, and an outlet mechanism configured for moving the steam outlet into contact with the closure aperture.

2. The coffee machine according to claim 1, wherein the outlet mechanism comprises a hollow body having a radial aperture, a movable piece, a resilient member for moving the movable piece within the body, and a control member operatively associated with the resilient member for moving the steam outlet when desired.

3. The coffee machine according to claim 2, wherein the control member includes a control finger emerging from the frame of the machine and pivotable about a pivot, one end of which is solidly fixed to the body and the other end of which is shaped like a sprout.

4. The coffee machine according to claim 3, further comprising a guide for the receptacles wherein the control finger acts on a microswitch for controlling the production of steam, and is displaced by a lateral wall of the receptacle when the latter is in the operating position defined by the guide.

5. The coffee machine according to claim 1, wherein the closure of the receptacle includes a steam tube connected to the aperture in the closure and directed towards the receptacle interior.

6. The coffee machine according to claim 1, wherein the closure of the receptacle comprises an aspirator configured for allowing the liquid to be aspirated by the tube and directed towards an outlet jet by a venturi effect.

7. The coffee machine according to claim 1, wherein the aspirator is formed by an intake chamber communicating in its upper part with a pipe connected to the steam tube and in its lower part with a pipe ending in an aperture of the outlet jet.

8. The coffee machine according to claim 6, wherein the outlet jet is pivotably mounted in the closure and, depending on its relative position with relation to the closure, it allows liquid to pass towards the outlet or steam to enter directly into the receptacle.

9. The coffee machine according to claim 1, wherein the closure of the receptacle comprises a steam tube, an outlet jet and an internal jet, the outlet tube being pivotable to different positions to enable the liquid to emerge either to the outlet jet or to the internal jet.

10. The coffee machine according to claim 1, which further comprises a base provided with a guide and a stop that define a seating intended to accommodate and maintain the receptacle in an operating position.

11. A receptacle for emulsifying a liquid, comprising a leaktight closure having an aperture connected to a steam tube that extends into the receptacle, the aperture of the receptacle being intended to be connected to the steam outlet of a coffee machine.

12. The receptacle according to claim 11, wherein the aperture is connected to an intake chamber which is itself connected on one side to an outlet jet and on the other side by a venturi tube to the steam tube.

13. The receptacle according to claim 12, wherein the outlet jet is pivotable in the closure of the receptacle and, depending on its relative position in relation to the closure, a connection to the intake chamber is sealed or opened.

14. The receptacle according to claim 11, wherein the aperture is shaped so as to be automatically connected to the steam outlet of a coffee machine when the receptacle is positioned on that machine.

15. The receptacle according to claim 11, wherein the aperture in the closure is connected to an intake chamber, which is itself connected to an outlet jet, by a venturi tube to a steam tube and to an internal jet.

16. A receptacle for emulsifying a liquid, comprising a leaktight closure having an aperture connected to a steam tube that extends into the receptacle, the aperture of the receptacle being intended to be connected to the steam outlet of the coffee machine of claim 1.

17. The receptacle according to claim 16, wherein the aperture is connected to an intake chamber which is itself connected on one side to an outlet jet and on the other side by a venturi tube to the steam tube.

18. The receptacle according to claim 17, wherein the outlet jet is pivotable in the closure of the receptacle and, depending on its relative position in relation to the closure, a connection to the intake chamber is sealed or opened.

19. The receptacle according to claim 16, wherein the aperture is shaped so as to be automatically connected to the steam outlet of a coffee machine when the receptacle is positioned on that machine.

20. The receptacle according to claim 16, wherein the aperture in the closure is connected to an intake chamber, which is itself connected to an outlet jet, by a venturi tube to a steam tube and to an internal jet.

21. The coffee machine according to claim 1, wherein the outlet mechanism comprises means for moving the steam outlet into contact with the closure aperture.

* * * * *